United States Patent
Shan et al.

(10) Patent No.: US 10,936,212 B2
(45) Date of Patent: *Mar. 2, 2021

(54) MEMORY CONTROLLER, METHOD FOR PERFORMING ACCESS CONTROL TO MEMORY MODULE

(71) Applicant: MONTAGE TECHNOLOGY CO., LTD., Shanghai (CN)

(72) Inventors: Gang Shan, Shanghai (CN); Howard Chonghe Yang, Shanghai (CN); Yi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 12 days.

This patent is subject to a terminal disclaimer.

(21) Appl. No.: 16/239,549

(22) Filed: Jan. 4, 2019

(65) Prior Publication Data
US 2019/0205049 A1   Jul. 4, 2019

(30) Foreign Application Priority Data

Jan. 4, 2018   (CN) .......................... 201810008762.5
Jan. 23, 2018  (CN) .......................... 201810064588.4
(Continued)

(51) Int. Cl.
*G06F 12/08*   (2016.01)
*G06F 3/06*    (2006.01)

(52) U.S. Cl.
CPC .......... *G06F 3/0622* (2013.01); *G06F 3/0629* (2013.01); *G06F 3/0659* (2013.01); *G06F 3/0673* (2013.01); *G06F 12/08* (2013.01)

(58) Field of Classification Search
None
See application file for complete search history.

(56) References Cited

U.S. PATENT DOCUMENTS 8,170,205 B2 *  5/2012  Takeda ................ G06F 12/1408
                                                      380/37
8,321,687 B2 * 11/2012  LeQuere ................ G06F 21/72
                                                      713/189
(Continued)

FOREIGN PATENT DOCUMENTS

CN   103154963 A   6/2013
CN   105868125 A   8/2016
(Continued)

*Primary Examiner* — Elias Mamo
(74) *Attorney, Agent, or Firm* — Jun He Law Offices P.C.; James J. Zhu

(57) ABSTRACT

The application discloses a memory controller and a method for controlling an access to a memory module. The memory controller is coupled between the memory module and a host controller to control the access of the host controller to the memory module. The memory controller comprises: a central buffer coupled to the host controller for receiving data access command from the host controller and coupled to the memory module for providing an encrypted data access command to the memory module; wherein the central buffer comprises a command processing module, for performing encryption operation to a data access command with a predefined command encryption algorithm to generate an encrypted data access command; wherein a data channel is coupled between the memory module and the host controller, and wherein under the control of the encrypted data access command, the memory module exchanges data with the host controller via the data channel.

30 Claims, 7 Drawing Sheets

(30) Foreign Application Priority Data

Apr. 11, 2018 (CN) .......................... 201810321501.2
Aug. 15, 2018 (CN) .......................... 201810929033.8

(56) References Cited

U.S. PATENT DOCUMENTS

| | | | | |
|---|---|---|---|---|
| 8,355,499 | B2* | 1/2013 | Asnaashari | H04L 9/0631 380/28 |
| 10,114,586 | B1* | 10/2018 | Benisty | G06F 3/061 |
| 2006/0259674 | A1* | 11/2006 | Dunstan | G06F 9/52 710/240 |
| 2014/0115656 | A1* | 4/2014 | Kim | G06F 21/78 726/1 |
| 2015/0095661 | A1* | 4/2015 | Sell | G06F 12/1408 713/193 |
| 2015/0232056 | A1* | 8/2015 | Miron | B60R 21/2338 280/735 |
| 2015/0235056 | A1* | 8/2015 | Cho | G06F 21/78 713/189 |
| 2015/0363338 | A1* | 12/2015 | Cho | G06F 3/0673 711/154 |
| 2017/0024266 | A1* | 1/2017 | Iwai | G06F 11/3656 |
| 2018/0024927 | A1* | 1/2018 | Ryu | G06F 12/0831 365/189.05 |
| 2018/0095898 | A1* | 4/2018 | Khosravi | G06F 21/445 |
| 2018/0365069 | A1* | 12/2018 | Nemiroff | G06F 9/5027 |

FOREIGN PATENT DOCUMENTS

| | | |
|---|---|---|
| CN | 110007849 A | 7/2019 |
| CN | 110008148 A | 7/2019 |
| EP | 1536311 A1 | 6/2005 |

* cited by examiner

MEMORY CONTROLLER, METHOD FOR PERFORMING ACCESS CONTROL TO MEMORY MODULE

CROSS REFERENCE TO RELATED APPLICATIONS

This application is based on and claims priority to Chinese Patent Application No. 201810064588.5 filed on Jan. 23, 2018, Chinese Patent Application No. 201810008762.4 filed on Jan. 4, 2018, Chinese Patent Application No. 201810321501.8 filed on Apr. 11, 2018, and Chinese Patent Application No. 201810929033.2 filed on Aug. 15, 2018, the entire contents of which are incorporated herein by reference.

TECHNICAL FIELD

The application generally relates to memory technology, and more particular to a memory controller and a method for performing access control to a memory module.

BACKGROUND

The rapid development of Internet technology enables the interconnection and communication between network devices such as computers, mobile terminals, etc. People can easily obtain information through these interconnected network devices. However, data and information security issues are increasingly emerging, along with the convenience of obtaining information. Networked devices may be easily attacked by external unauthorized devices, either accidentally or maliciously, thereby causing damage, disclosure or tampering of internal data.

Thus, there is a need to improve conventional computers or other electronic devices to improve their data security.

SUMMARY

One objective of the application is to provide a memory controller and a method for performing access control to a memory module to improve its data security.

According to one aspect of the application, a memory controller is provided. The memory controller is coupled between a memory module and a host controller to control access of the host controller to the memory module. The memory controller comprises: a central buffer coupled to the host controller, for receiving a data access command from the host controller, and coupled to the memory module, for providing an encrypted data access command to the memory module; wherein, the central buffer comprises an access command processing module having a predefined command encryption algorithm, and the access command processing module configured to perform an encryption process on the data access command with the predefined command encryption algorithm to generate an encrypted data access command; wherein a data channel is coupled between the memory module and the host controller, and wherein under the control of the encrypted data access command the memory module exchanges data with the host controller via the data channel.

In some embodiments, the data access command and the encrypted data access command contain respective access addresses, and the encryption process makes the access address contained in the encrypted data access command different from the access address contained in the data access command.

In some embodiments, the central buffer is configured to receive an algorithm configuration command to configure the predefined command encryption algorithm in the access command processing module, and wherein an interface via which the central buffer receives the algorithm configuration command is an interface for receiving the data access command or a system management bus interface.

In some embodiments, the predefined command encryption algorithm in the access command processing module is configured when the memory controller is initialized.

In some embodiments, the access command processing module further contains a predefined command decryption algorithm, the data access command received by the memory controller is a pre-encrypted data access command, and the memory controller is further configured to perform a decryption process on the pre-encrypted data access command with the predefined command decryption algorithm, and further perform an encryption process to the decrypted data access command with the predefined command encryption algorithm.

In some embodiments, the memory controller further comprises: a data buffer coupled within the data channel, and coupled to the central buffer for receiving the encrypted data access command therefrom, such that under the control of the encrypted data access command, the memory module exchanges data with the central buffer via the data buffer within the data channel.

In some embodiments, the data buffer comprises a data processing module which contains at least one of a predefined data encryption algorithm and a predefined data decryption algorithm; and the data processing module is configured for receiving data from the host controller or the memory module, performing an encryption process on the data with the predefined data encryption algorithm, and sending the encrypted data to the host controller or the memory module; or the data processing module is configured for receiving encrypted data from the host controller or the memory module, performing a description process on the encrypted data with the predefined data decryption algorithm, and sending the decrypted data to the host controller or the memory module.

In some embodiments, the data processing module contains a predefined data encryption algorithm and a predefined data decryption algorithm; the data processing module is configured for receiving pre-encrypted data from the host controller, performing a description process on the pre-encrypted data with the predefined data decryption algorithm, then performing an encryption process on the decrypted data with the predefined data encryption algorithm, and sending the encrypted data to the memory module.

In some embodiments, the central buffer and the data buffer are coupled to each other via a data buffer control bus, and the data processing module is configured to receive an algorithm configuration command via the data buffer control bus, and wherein the algorithm configuration command is for configuring at least one of the predefined data encryption algorithm and the predefined data decryption algorithm.

In some embodiments, the predefined data encryption algorithm and the predefined data decryption algorithm of the data processing module is configured when the memory controller is initialized.

In some embodiments, the memory module and the memory controller are in accordance with the JEDEC Double Data Rate (DDR) Synchronous Dynamic Random Access Memory (SDRAM) standard, the central buffer is integrated in a register clock driver.

According to another aspect of the application, a memory controller is further provided. The memory controller is coupled between a memory module and a host controller to control access of the host controller to the memory module. The memory controller comprises: a central buffer coupled to the host controller, for receiving a data access command from the host controller, and coupled to the memory module, for providing a data access command to the memory module; and a data buffer coupled to the central buffer, for receiving the data access command from the central buffer, and coupled between the host controller and the memory module, for exchanging data between the host controller and the memory module under the control of the data access command; wherein, the data buffer comprises a data processing module containing at least one of a predefined data encryption algorithm and a predefined data decryption algorithm; the data processing module is configured for receiving data from the host controller or the memory module, performing an encryption process on the data with the predefined data encryption algorithm, and sending the encrypted data to the host controller or the memory module; or the data processing module is configured for receiving encrypted data from the host controller or the memory module, performing a decryption process on the encrypted data with the predefined data decryption algorithm, and sending the decrypted data to the host controller or the memory module.

According to another aspect of the application, a method for performing access control to a memory module is further provided, the memory module being coupled to a host controller via a memory controller and a data channel, the memory controller comprising a central buffer having an access command processing module, wherein the access command processing module contains a predefined command encryption algorithm for performing an encryption process on a data access command; the method comprises: receiving, via the central buffer, a data access command; performing, via the central buffer, an encryption process on the data access command to generate an encrypted data access command; providing, via the central buffer, the encrypted data access command to the memory module and the data buffer; and exchanging, via the data channel, data between the host controller and the memory module according to the encrypted data access command.

According to another aspect of the application, a method for performing access control to a memory module is further provided, the memory module being coupled to a host controller via a memory controller, the memory controller comprising a central buffer and a data buffer having a data processing module, wherein the data processing module contains at least one of a predefined data encryption algorithm and a predefined data decryption algorithm; the method comprises: receiving, via the central buffer, a data access command; receiving, via the data buffer, data from the host controller or the memory module, performing, via the data processing module, an encryption process on the data with the predefined data encryption algorithm, and sending, via the data processing module, the encrypted data to the host controller or the memory module under the control of the central buffer according to the data access command; or receiving, via the data buffer, encrypted data from the host controller or the memory module under the control of the central buffer, performing, via the data processing module, a decryption process on the encrypted data with the predefined data decryption algorithm, and sending, via the data processing module, the decrypted data to the host controller or the memory module under the control of the central buffer according to the data access command.

The foregoing is a summary of the present application, and may be simplified, generalized or omitted in detail. Thus, it should be appreciated by those skilled in the art that this part is only exemplary and illustrative, but is not intended to limit the scope of the present application in any ways. This summary part is nether intended to determine the key feature or necessary feature of the subject sought to be protected, nor intended to be used as a supplementary method for determining the scope of the subject sought to be protected.

BRIEF DESCRIPTION OF THE DRAWINGS

The aforementioned features and other features of the present application will be fully understood via the following specification and the appended claims in combination with the accompanying drawings. It can be understood that, these accompanying drawings merely illustrate certain embodiments in accordance with the present application and should not be considered as limitation to the scope of the present application. By using the accompanying drawings, the content of the present application will be described more clearly and detailedly.

DETAILED DESCRIPTION

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and scope of the application. It can be understood that, the various aspects of the application described and graphically presented herein may be arranged, replaced, combined, divided and designed in many different configurations, and these different configurations are explicitly included in the application.

Figure 1A:
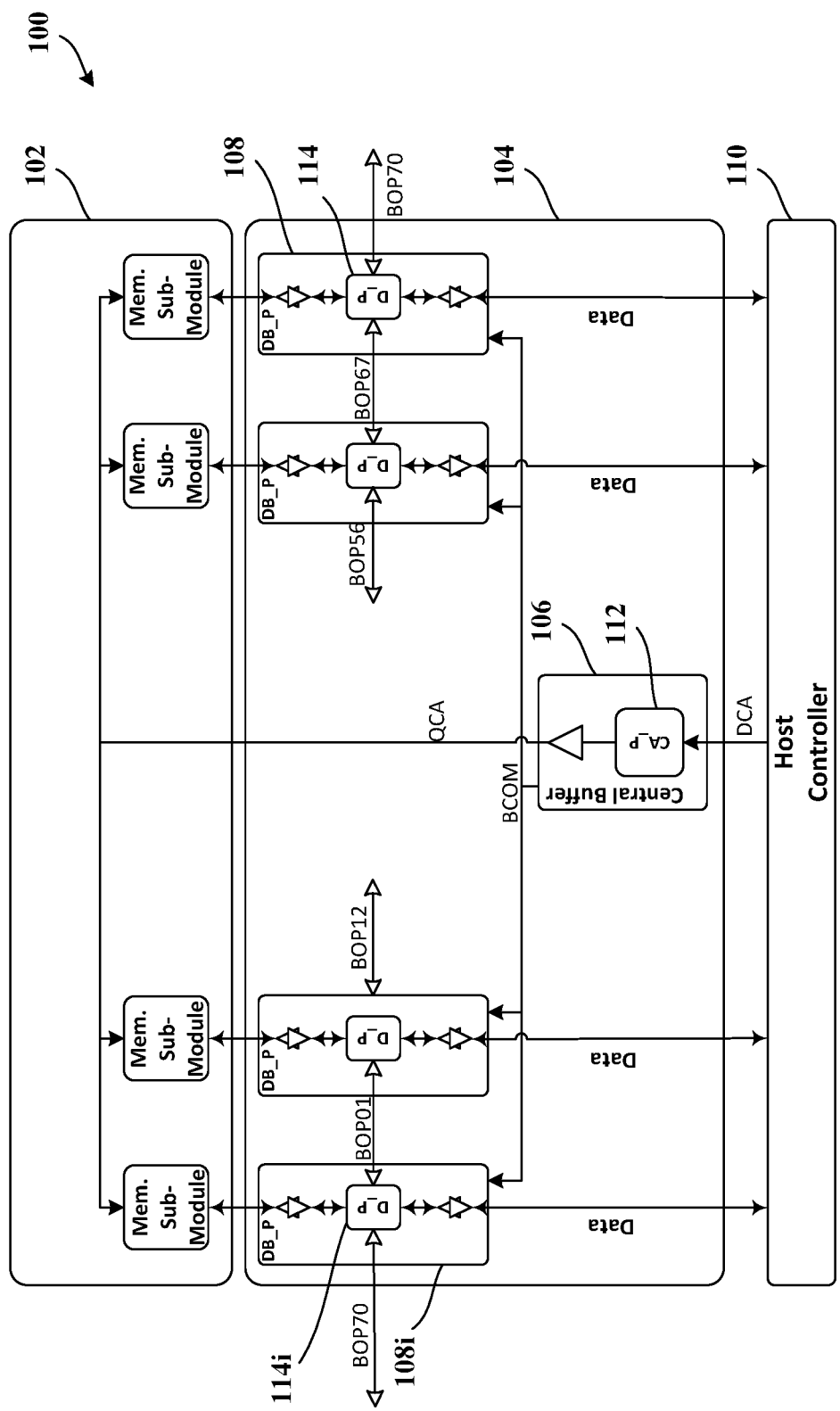
FIG. 1a illustrates a memory system 100 according to an embodiment of the application.

FIG. 1a shows a memory system 100 according to an embodiment of the application.

As shown in FIG. 1a, the memory system 100 comprises a memory module 102 which is configured as a memory module group in the present embodiment, for storing data. In the embodiment shown in FIG. 1a, the memory module 102 has a plurality of memory submodules (denoted as "Mem.

Sub-Module"). In some embodiments, the memory module 102 can be a memory module in accordance with the JEDEC Double Data Rate (DDR) Synchronous Dynamic Random Access Memory (SDRAM) standard, including, for example, the JEDEC DDR, DDR2, DDR3, DDR4, DDR5 and other DDR standards. Moreover, the memory module 102 can be an internal memory in accordance with other standards or protocols, e.g. a SDRAM or RAMBUS memory. In some embodiments, the memory module 102 may comprise a volatile memory (e.g., RAM), a non-volatile memory (e.g., NAND or NOR flash memory) or a combination thereof.

In some other embodiments, the memory module 102 may be new types of memories manufactured using other processes, including but not limited to, a magnetoresistive memory, a phase change memory, a resistive memory, a semi-floating gate memory or any other types of memories. It can be appreciated that the memory module 102 may be consisted of a single type of memory, or may include multiple or all of the aforementioned or other types of memories, or include more other types of memories, It should be noted that, the memory module 102 herein can be a memory chip of a single die or a memory chip of two or more dies. Furthermore, the memory array or memory dies included in the memory module 102 may have any suitable interconnected structure. For example, multiple memory dies may be connected in parallel to form a memory module, alternatively, multiple memory dies may be connected as a multi-level interconnected structure (e.g. two levels). For example, one or more memory dies may be used as a first memory level, and the other one or more memory dies may be used as a second memory level, thus providing different levels of memory. The lower second memory level may interchange data with exterior components of the memory module via the first memory level. A specific multi-level interconnected structure will be elaborated below.

As shown in FIG. 1a, the memory system 100 can further comprise a memory controller 104 having a central buffer 106 and a data buffer (DB_P) 108. In particular, the central buffer 106 is coupled between a host controller 110 and the memory module 102 and can receive a data access command containing an access address and an access type from the host controller 110. For example, the data access command may be a command of accessing (e.g., reading or writing) a data storing address (i.e., the access address) in the memory module 102. The data buffer 108 is coupled between the memory module 102 and the host controller 110, for exchanging data between the memory module 102 and the host controller 110 under the control of the central buffer 106. For the memory system in accordance with the DDR3 or DDR4 standard, the central buffer can be integrated in a register clock driver (RCD). Correspondingly, the central buffer is coupled to the host controller 110 via a command/address (C/A) bus, e.g. a bus DCA shown in FIG. 1, to receive a data access command. For the memory system in accordance with the DDR4 standard, the C/A bus may comprise pins A0-A17, pins BG0-BG1 and/or pins BA0-BA1. The pins BG0-BG1 are used to determine which memory bank group in the memory module 102 is to be processed, e.g. being written into or being read from. The pins BA0-BA1 are used to determine which memory bank in the memory module 102 is to be processed, and the pins A0-A17 are used for addressing and determining which memory unit in a memory bank is to be processed. Moreover, input to the pins A16 (RAS_n), A15 (CAS_n) and A14 (WE_n) is used for identifying a data access command inputted such as a read command, a write command or other predefined control commands.

Different from the existing central buffers, an access command processing module (CA_P) 112 is configured in the central buffer 106, which can be constructed as a module having data processing and calculating ability. In some embodiments, the access command processing module 112 can be implemented by software, hardware, firmware or a combination thereof. For example, the access command processing module 112 can be an application specific integrated circuit or a field programmable logic array chip. The access command processing module 112 can process a data access command received from the host controller 110, so as to generate a modified data access command.

Moreover, the access command processing module 112 can provide the modified data access command to the memory module 102 and the data buffer 108, such that the two can continue to perform a data access process according to the modified data access command. For example, the access command processing module 112 may provide the modified data access command and other control commands via the C/A bus QCA between the central buffer 106 and the memory module 102, and provide the modified data access command and other control commands via the data buffer control bus BCOM between the central buffer 106 and the data buffer 108. In some embodiments, the access command processing module 112 can generate one or more access addresses according to the access address contained in the data access command, and the one or more access addresses can be provided to the memory module 102 for addressing during data accessing. For example, a C/A bus QCA is configured between the memory module 102 and the central buffer 106 for signal and command interaction therebetween. Meanwhile, the access command processing module 112 also generates a corresponding access type according to the access type of the data access command, such that, the data buffer 108 can control the data exchange between the accessed memory unit in the memory module 102 and the host controller 110 according to the generated access type.

The access command processing module 112 can generate a modified data access command in any desired manners. In some embodiments, the access command processing module can encode the access address in the data access command, so as to cause the modified data access command to contain an encoded access address. In some other embodiments, the access command processing module can process the access address in the data access command with a predefined address processing algorithm, so as to generate a group of access addresses based on the access address. Each access address of the generated group of access addresses can correspond to a modified data access command. Optionally, these modified data access commands can have the same access type as the original data access command. For example, the data access command received from the host controller 110 may be a data access command for reading an access address in the memory module 102, so the generated modified data access commands can be data access commands for reading multiple access addresses related to the access address.

In some embodiments, the access command processing module 112 may have a predefined command encryption algorithm and a predefined command decryption algorithm. Through the command encryption algorithm, the access command processing module 112 can perform an encryption process to the access address contained in the received data access command, so as to make the encrypted access address different from the access address before the encryption (in plaintext). The encrypted access address may be contained in the modified data access command, i.e., as the encrypted data access command. As such, the encrypted data access command may be further provided to the memory module 102 and the data buffer 108, to control the data buffer 108 to exchange data between the memory module 102 and the host controller 110. It can be understood that, the encrypted data access command provided to the memory module 102 and the data buffer 108 may be a complete command or a part thereof. For example, the data access command can generally include an access address and an access type. For the memory module 102, it only needs to obtain the encrypted access address contained in the encrypted data access command for the need of addressing. For example, the memory unit in the memory module 102 corresponding to the encrypted access address can be addressed for data accessing. Similarly, for the data buffer 108, it only needs to obtain the information of the access type (e.g., reading or writing) from the central buffer 106. As such, the memory module 102 and the data buffer 108 can perform data accessing under the control of the encrypted data access command provided by the central buffer 106. It should be noted that, that the encrypted access address is different from the access address before encryption as described herein does not mean that the two addresses are always different from each other. Rather, the two addresses can be different from each other from a statistical perspective (in most cases). In some cases, depending on the encryption rule of the command encryption algorithm, there is certain probability that the encrypted access address and the unencrypted access address are the same (for example, there is one address out of fifty access addresses that does not change before and after encryption).

It should be noted that, performing an encryption or a decryption process on the data and/or address is substantially similar to performing a scrambling or a descrambling process, thus the encryption and decryption used in the application include scrambling and descrambling respectively.

For example, the data access performed by the host controller 110 to the memory module 102 can include, for example, read operation and write operation. When performing the write operation, the host controller 110 sends an unencrypted write operation command to the central buffer 106. The unencrypted write operation command directs to a first address in the memory module 102. Correspondingly, the central buffer 106 performs an encryption process on the write operation command with the predefined command encryption algorithm, so as to generate an encrypted write operation command. The encrypted write operation command directs to a second address in the memory module 102. Based on the second address, the data received from the host controller 110 is written into the memory module 102 through the data buffer 108. On the other hand, when performing the read operation, the host controller 110 sends the unencrypted read operation command to the central buffer 106. The read operation command, for example, is used for reading data corresponding to the first address. Correspondingly, the central buffer 106 performs an encryption process on the read operation command with the predefined command encryption algorithm, so as to generate an encrypted read operation command. Because the encryption processes performed on the read operation command and the write operation command use the same command encryption algorithm, the encrypted read operation command also directs to the second address in the memory module 102. As such, the data written into the second address during the write operation can be correctly read out from the memory module 102.

It can be seen that in the foregoing process of the encryption access, the access between the memory controller 104 and the memory module 102 is encrypted. Without knowing the information of the predefined command encryption algorithm, the host controller 110 is unable to know which address in the memory module 102 stores the desired data. Thus, illegal or unauthorized programs running on the host controller 110 or other illegal or unauthorized programs are unable to access the desired data in the memory module 102 by sending the address of the designated memory module, which significantly improves the security of data access to the memory module 102.

In some embodiments, the data access command received from the host controller 110 may be a pre-encrypted data access command. For example, the host controller 110 may perform an encryption process on the data access command with a predefined command encryption algorithm A, and generate a pre-encrypted data access command. Correspondingly, after receiving the pre-encrypted data access command, the central buffer 106 performs an decryption operation on the pre-encrypted data access command with a corresponding command decryption algorithm A', so as to obtain an unencrypted data access command. Then, the central buffer 106 further performs an encryption process on the unencrypted data access command with a command encryption algorithm B contained in the central buffer 106, so as to obtain a re-encrypted data access command. Based on the re-encrypted data access command, the data received from the host controller 110 can be written into the memory module 102. It can be seen that, this method also encrypts the command communication between the host controller 110 and the memory controller 104, which further improves the security of the memory system.

The access command processing module 112 has a predefined command encryption algorithm and/or a predefined command decryption algorithm. These algorithms can be configured by the configuration information stored in a register table. As mentioned above, the host controller 110 can send the data access command to the central buffer 106 via a command/address (C/A) bus. In some embodiments, the host controller can send an algorithm configuration command to the central buffer 106 via the same bus. The algorithm configuration command can be used for configuring the command encryption algorithm or the command decryption algorithm in the access command processing module 112. As such, the command encryption algorithm and/or command decryption algorithm can be loaded to the access command processing module 112, or the existing command encryption algorithm and/or command decryption algorithm in the access command processing module 112 can be modified or configured. For example, the algorithm configuration command can be sent via some signal lines for sending mode register set (MRS) in the command/address bus. In some other embodiments, the host controller 110 can send the algorithm configuration command to the central buffer 106 via different interfaces/buses. For example, the algorithm configuration command can be sent to the central buffer 106 via a system management bus (SMBus) interface. Since these specialized interfaces are usually unable to be accessed by illegal programs, using these interfaces to send the algorithm configuration command contributes to improving the security of the system.

In some embodiments, the loading or modification of the command encryption algorithm and/or command decryption algorithm may be dynamic, that is, when the memory controller 104 is initialized (powered up), these algorithms are loaded into the access command processing module 112. When the memory controller 104 is powered down, or the central buffer 106 resets, the data and configuration of these algorithms are eliminated.

In the embodiment shown in FIG. 1a, in addition to configuring the access command processing module 112 in the central buffer 106, a data processing module (D P) 114 is configured in the data buffer 108. The data processing module 114 can receive data from the host controller 110 and/or the memory module 102 which are coupled to the data processing module 114, process the received data with a predefined data processing algorithm, and then send the processed data to the host controller 110 and/or the memory module 102. In some embodiments, when the host controller 110 instructs to read data from the memory module 102, the data buffer 108 can buffer the data received from the memory module 102, and process the data via the data processing module 114. As such, the data obtained by the host controller 110 is processed data. In some other embodiments, when the host controller 110 instructs to write data into the memory module 102, the data buffer 108 can also buffer data received from the host controller 110, process the data via the data processing module 114, and then write the data into the memory module 102. As such, the data stored in the memory module 102 is processed data.

In some embodiments, the data processing module 114 can receive data from the memory module 102 and process the data, so as to send the processed data to the memory module 102. In other words, benefited from the data processing module 114 in the data buffer 108, data can be directly processed in the memory controller 104 without being transferred to the host controller 110 for processing, which significantly reduces the data exchange between the host controller 110 and the memory module 102 and effectively improves data processing.

Similar to the access command processing module 112, the data processing module 114 may have a predefined data encryption algorithm and/or a predefined data decryption algorithm. The data encryption algorithm can perform an encryption process on data, and the data decryption algorithm can perform a decryption process on encrypted data. Depending on the source and destination of data, complicated encryption/decryption process can be achieved with the data processing module 114, so as to improve the security of the whole memory system.

In some embodiments, the data processing module 114 may have a data encryption algorithm and a data decryption algorithm matching with each other. When performing a write operation, the data buffer 108 can receive data from the host controller, perform an encryption process on the data via the data processing module 114 with the data encryption algorithm, and write the encrypted data into the memory module 102. Correspondingly, when performing a read operation, the data buffer 108 can read encrypted data from the memory module 102, perform a decryption process on the encrypted data with the data decryption algorithm, and send the decrypted data to the host controller 110. It can be seen that, since the data stored in the memory module 102 is encrypted data, it is difficult to decrypt these data to obtain the correct data content even though illegal programs obtains these data, which improves the security of the memory system.

In some other embodiments, the data processing module 114 may only have a data encryption algorithm which is used to perform an encryption process on the data read from the memory module 102, such that the data buffer 108 can send the encrypted data to the host controller 110. Correspondingly, the host controller 110 can contain a matching data decryption algorithm, so as to perform a decryption process on the encrypted data. In other words, the read operation of the host controller 110 to the memory module 102 is encrypted, and only legal or authorized programs (containing or being able to call a matching data decryption algorithm) are able to decrypt the read data and obtain the correct data content.

In some other embodiments, the data processing module 114 can contain multiple data encryption algorithms and data decryption algorithms. For example, the data sent by the host controller 110 to the memory controller 104 can be pre-encrypted data (using a data encryption algorithm C). When performing a write operation, the data buffer 108 receives pre-encrypted data from the host controller 110, and decrypt the pre-encrypted data via the data processing module 114 with a matching data decryption algorithm C', so as to obtain the decrypted data. Meanwhile, the data processing module 114 also contains an additional data encryption algorithm D and an additional data decryption algorithm D'. Moreover, the data processing module 114 can perform an encryption process on the decrypted data again with the data encryption algorithm D to obtain re-encrypted data, such that the data buffer 108 can write the re-encrypted data into the memory module 102. Correspondingly, when performing a read operation, the data buffer 108 can receive re-encrypted data from the memory module 102, and perform a decryption process on the re-encrypted data with the data decryption algorithm D', so as to obtain decrypted data. Afterwards, the data buffer 108 can send the decrypted data to the host controller 110.

In some other embodiments, the data processing module 114 can perform rewrite operation to data. In this situation, the data processing module 114 can perform a decryption process on the encrypted data stored in the memory module 102 with a predefined data decryption algorithm, and then modify the decrypted data with a predefined data process algorithm. Afterwards, the data processing module 114 can also perform an encryption process on the modified data with a predefined data encryption algorithm, and write the encrypted data back into the memory module 102.

In some embodiments, the data buffer 108 may comprise multiple data buffering unit groups 108i, and each data buffering unit group 108i corresponds to a data processing sub-module 114i. In addition to being coupled in the path of the corresponding data buffering unit 108i, each different data processing sub-module 114i is coupled to each other through bidirectional interfaces BOP (such as BOP01, BOP12 . . . BOP67 and BOP70 in FIG. 1a), so as to exchange data between the multiple data buffering units 108i. Exchanging data between different data buffering units 108i can satisfy requirements of various data arithmetic operations. In some embodiments, the BOP interfaces may be a two-wire bidirectional bus structure, including a clock and a 1-bit bidirectional data line, and perform bidirectional data exchange through agreed protocols. In some other embodiments, the interfaces may be a three-wire bus structure, including a clock, a transmission direction indication signal, and a 1-bit bidirectional data line. The bandwidth of the BOP interfaces can be increased by adding the number of bidirectional data lines.

The data processing module 114 can respond to an operation command provided by the central buffer 106. For example, the operation command may be transmitted through the data buffer control bus (BCOM) between the central buffer 106 and the data buffer 108. In some memory systems in accordance with the DDR4 standard, such as M88DDR4DB02 and M88DDR4RCD02 chips provided by Montage Technology (Shanghai) Co., Ltd. (technical information of these chips can be found in their product manuals, which are incorporated in their entirety by reference herein), the data buffer control bus can be a 4-bit signal line.

In some embodiments, the data processing module 114 can receive an algorithm configuration command via a data buffer control bus, wherein the algorithm configuration command is for configuring at least one of the predefined data encryption algorithm and the predefined data decryption algorithm.

In some embodiments, the loading or modification of the command encryption algorithm and/or the command decryption algorithm can be dynamic. That is, when the memory controller 104 is initiated (powered up), these algorithms are loaded into the access command processing module 112; when the memory controller 104 is powered down, or the central buffer 106 is reset, the data and configuration of these algorithms are eliminated.

The embodiment shown in FIG. 1a comprises both the access command processing module 112 and the data processing module 114, thus after the access command processing module 112 has encrypted the data access command, the data processing module 114 can perform an encryption/decryption process on the data based on the encrypted data access command, and further exchange the encrypted/decrypted data between the memory module 102 and the host controller 110. In some embodiments, when processing the data access command or encrypted data access command, the central buffer 106 can determine the encryption and/or decryption process to be specifically performed by the data processing module 114. Correspondingly, the central buffer 106 can provide the encryption or decryption algorithm or indication to be specifically performed to the data processing module 114, and the data processing module 114 can process the data based on the obtained related information.

It can be understood that, in practical applications, the memory controller may only comprise one of the access command processing module 112 and the data processing module 114. For example, the memory controller can only comprise the access command processing module 112 to generate an encrypted data access command, and the encrypted data access command can instruct the data buffer 108 not to modify the data but only perform the normal read, write or others operations. For another example, the memory controller can also only comprise the data processing module 114 to perform an encryption or decryption process on the buffered data, and the specific type of the data operation can be determined by the data access command provided by the central buffer 106 through the BCOM bus.

Figure 2:
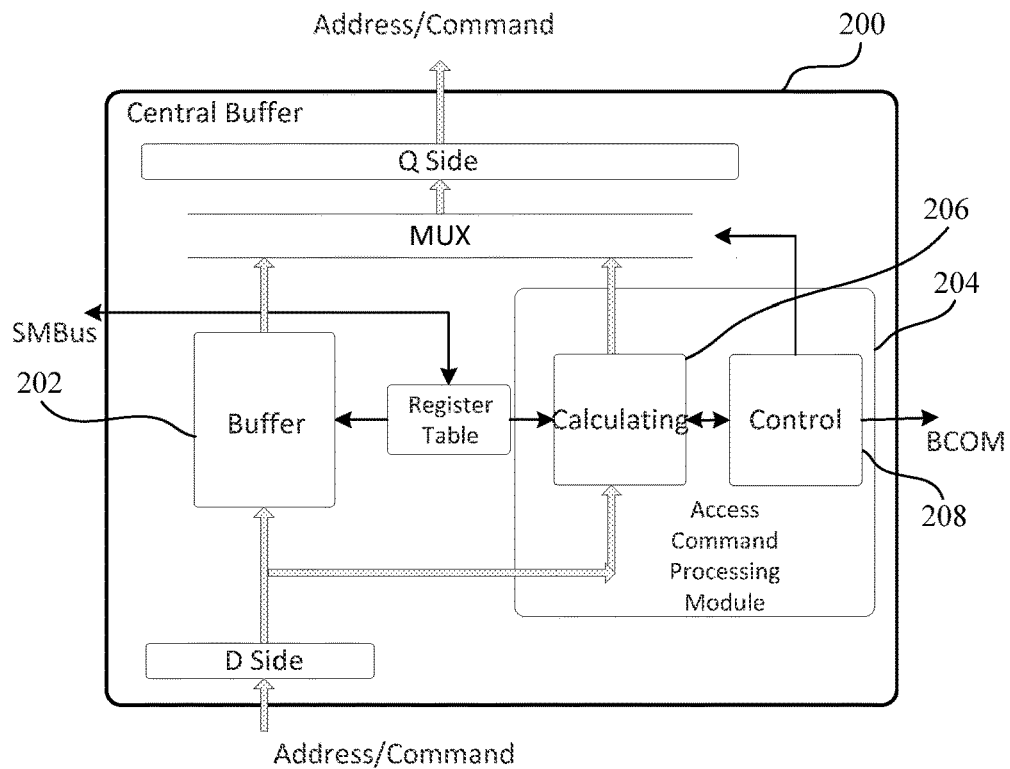
FIG. 2 illustrates an exemplary structure of a central buffer 200 according to an embodiment of the application.

FIG. 2 shows an exemplary structure of a central buffer 200 according to an embodiment of the application.

As shown in FIG. 2, the central buffer 200 comprises two signal paths coupled between a receiving side (D side) and an output side (Q side), via a buffer 202 and via an access command processing module 204 respectively. For the path of the buffer 202, after receiving the data access command (CMD&ADDR) containing an access address and an access type, the buffer 202 does not perform additional process on the data access command but merely buffers this command and then outputs it on the output side. For the access command processing module 204, it comprises a calculating module 206 and a control unit 208. After receiving the data access command sent from the host control module (not shown), the access command processing module 204 determines whether address processing and corresponding operation command generation, i.e., modifying the data access command, are needed based on a predefined triggering condition. After the triggering condition is satisfied, the access command processing module 204 performs an encryption process via a calculating module 206, and generates an encrypted data access command. Then, the control module 208 switches the output of the central buffer 200 from the buffer 202 to the output of the access command processing module 204 through a multiplexer (MUX), and simultaneously sends a corresponding control signal to each data processing module (not shown in the figure) of the data buffer via the BCOM bus, so as to instruct these data processing modules to perform corresponding data processing operations.

In some embodiments, the buffer 202 and the access command processing module 204 may be configured with the configuration information stored in the register table, and the configuration information of the register table can be modified via the SMBus interface.

Figure 3:
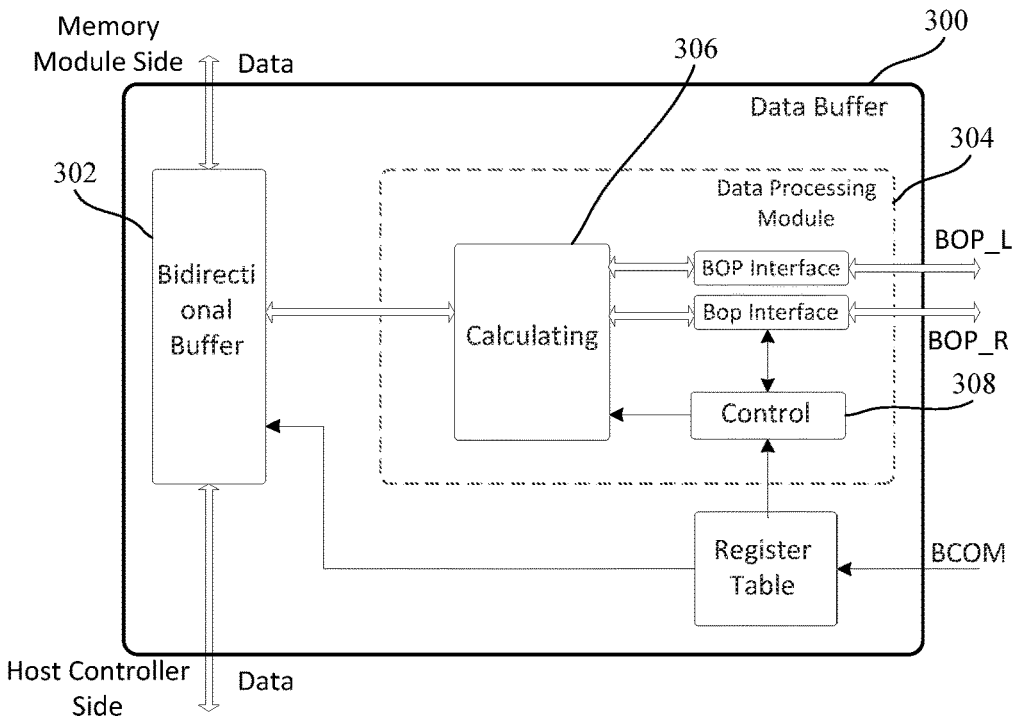
FIG. 3 illustrates an exemplary structure of a data buffer 300 according to an embodiment of the application.

FIG. 3 shows an exemplary structure of a data buffer 300 according to an embodiment of the application.

As shown in FIG. 3, the data buffer 300 comprises two signal paths coupled between a host controller side and a memory module side, respectively via a bidirectional buffer 302 and via a data processing module 304. For the path of the bidirectional buffer 302, it does not process received data but merely buffers data. For the data processing module 304, it comprises a calculating unit 306 and a control unit 308. Wherein, the calculating unit 306 further exchanges data with data processing modules of adjacent data buffers through a BOP interface. Thus, the calculating unit 306 can perform a corresponding encryption and/or decryption process on data based on the control command received by the control unit 308 from the BCOM bus. When the calculation needs data of other data buffers, the data processing module 304 can exchange data with adjacent data buffers via the BOP interfaces, wherein the BOP_L interface is used for exchanging data with data buffers on the left side, and the BOP_R interface is used for exchanging data with data buffers on the right side.

In some embodiments, the bidirectional buffer 302 and the data processing module 304 can be configured with the configuration information stored in the register table.

It should be noted that, the circuit architectures in the central buffers and data buffers shown in FIG. 2 and FIG. 3 are merely exemplary, and changes can be made to these circuit configurations based on need in practical applications.

It can be understood that, the memory controllers of the embodiments of the application can be applied in memories, and such memory system can be used in various computer systems.

In the embodiment shown in FIG. 1a, data exchange between the memory module 102 and the host module 110 is performed via the data buffer 108, for example, via Load Reduced Dual-Inline-Memory-Modules (LR DIMM) systems. In other words, the data buffer 108 is a part of a data channel between the memory module 102 and the host controller 110. In some alternative embodiments, the data channel between the memory module 102 and the host controller 110 may not include the data buffer 108.

Figure 4:
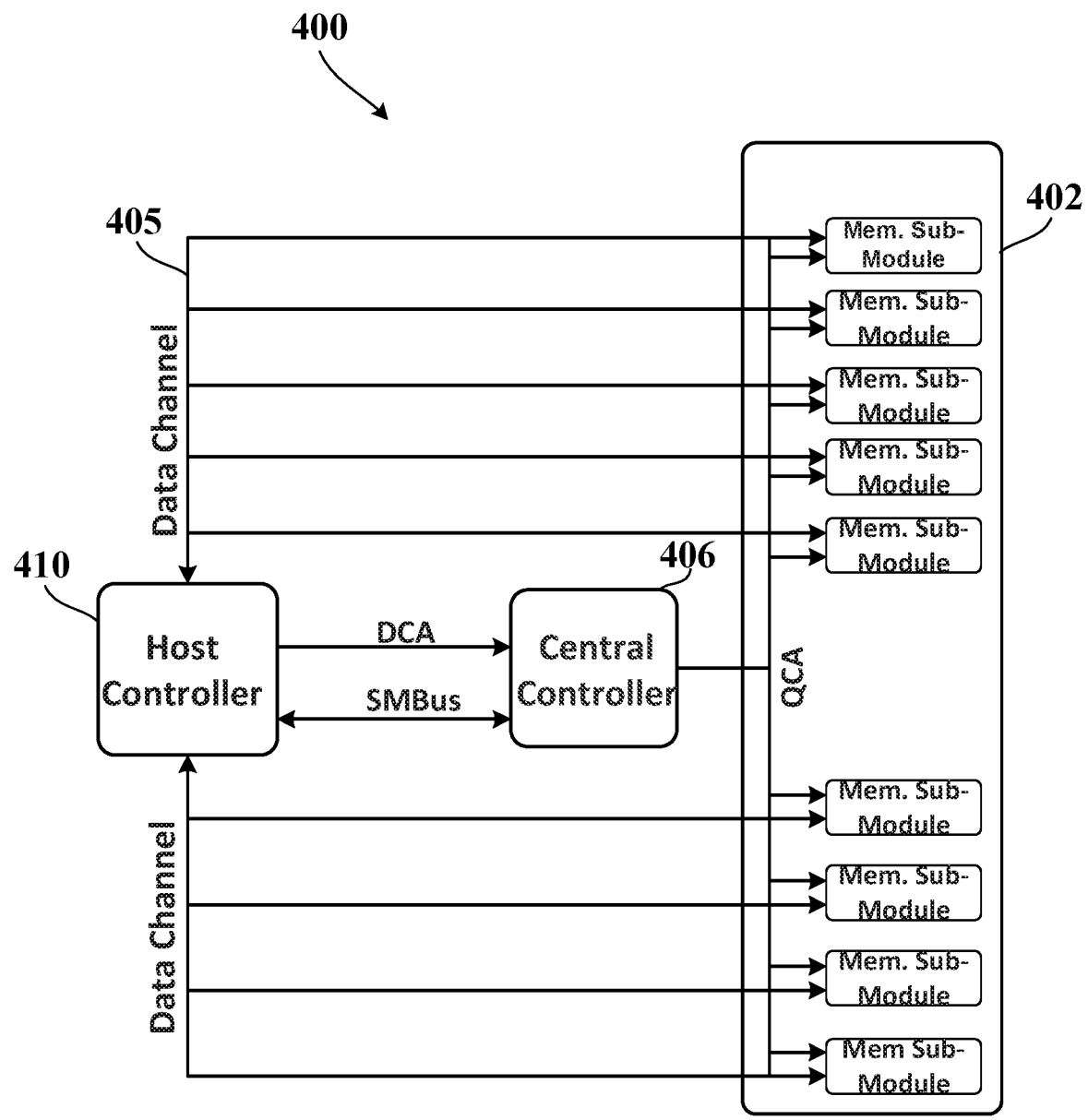
FIG. 4 illustrates another memory system 400 according to an embodiment of the application.

FIG. 4 illustrates another memory system 400 according to an embodiment of the application. As shown in FIG. 4, in the memory system 400, a memory module 402 and a host controller 410 is coupled to each other via a data channel 405 to exchange data therebetween. Different from the memory system 100 shown in FIGS. 1a and 1b, the data channel 405 does not have a data buffer. In some embodiments, the memory system 400 may be a registered DIMM.

Moreover, the memory system 400 further includes a central buffer 406 coupled to the host controller 410 via a command/address bus DCA and coupled to the memory module 402 via a buffered command/address bus QCA. Similar to the central buffer 106 shown in FIG. 1a, the central buffer 410 may include an access command processing module with an predetermined command encryption algorithm. The central buffer 406 may receive from the host controller 410 a data access command, and perform encryption process to the data access command to generate an encrypted data access command. Afterwards, the central buffer 406 may send the encrypted data access command to the memory module 402 via the buffered command/access bus QCA. As such, the central buffer 406 can directly control addressing of the memory module 402 based on the encrypted data access command, such that data can be read out from the memory module 402 to the host controller 410 or written from the host controller 410 into the memory module 402. In some embodiments, algorithm configuration command can be sent to the central buffer 406 via a system management bus (SMBus) interface.

Other more details of the central buffer 406 can be referred to the descriptions of the central buffer 106 in accordance with the embodiment shown in FIG. 1a, which will not be elaborated herein.

Figure 1B:
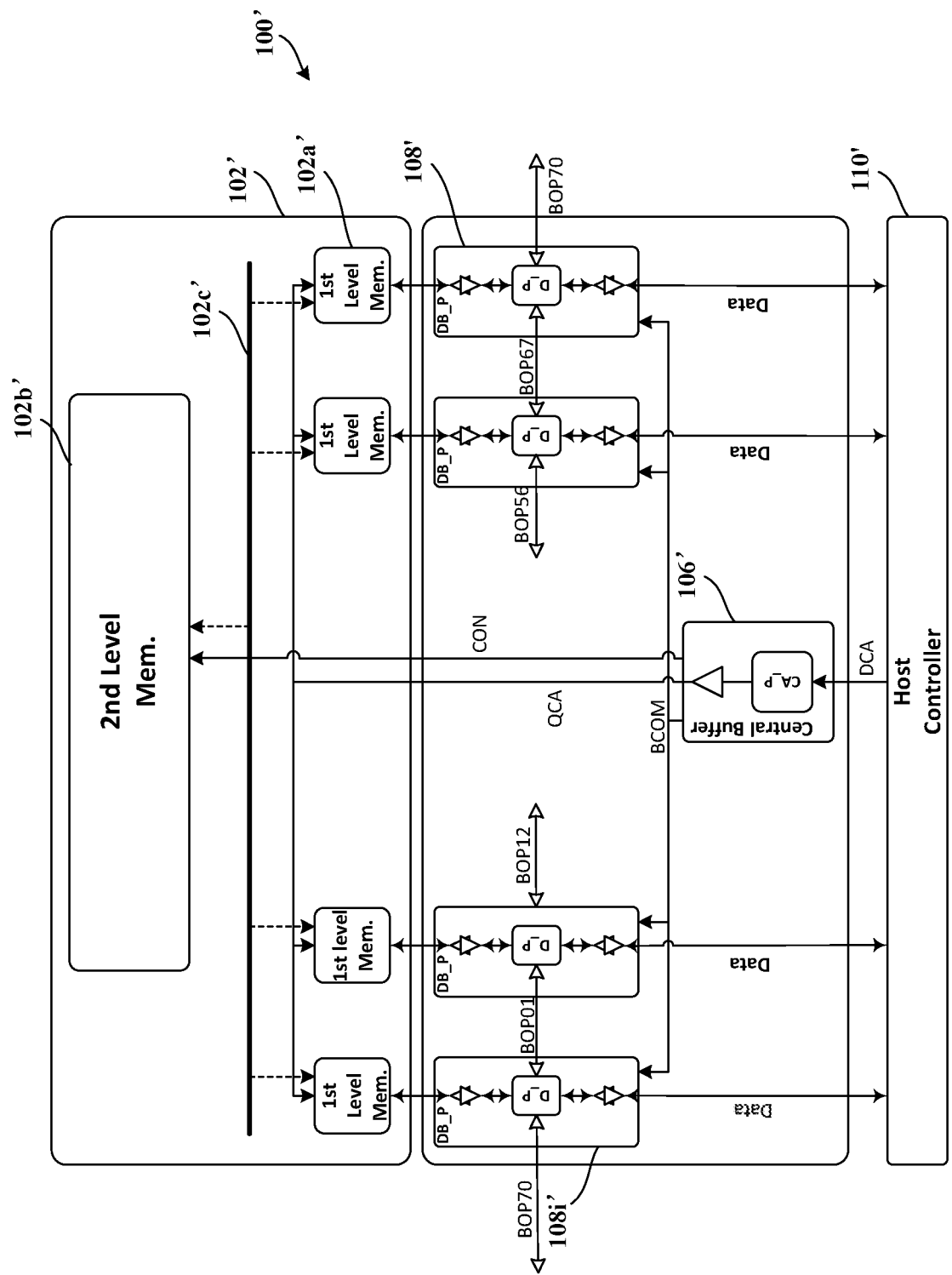
FIG. 1b shows a memory system 100' according to an embodiment of the application.

In another aspect, the memory controllers of the embodiments of the application can be used in various memory types and structures. FIG. 1b shows a memory system 100' according to another embodiment of the application. The memory system 100' has a structure generally similar to that of the memory system 100 shown in FIG. 1a, differing mainly between their respective memory modules 102 and 102'. In the embodiment shown in FIG. 1b, the memory controller is used with the memory module 102' having two levels of memory submodules. It can be appreciated that, in some embodiments, the memory controller can be used in memory systems with more memory levels. Structures, mechanisms and principles used in the memory system 100' that are similar to those in the memory system 100 shown in FIG. 1a will not elaborated herein.

As shown in FIG. 1b, the memory module 102' includes multiple first level memory submodules 102a', which are coupled to the host controller 110' via respective data buffers 108i' to exchange data therewith. The memory module 102' further includes a second level memory submodule 102b', which is coupled to the multiple first level memory submodules 102a' via the data bus 102c' to exchange data therewith. Moreover, all the first level memory submodules 102a' are coupled to the central buffer 106' via the C/A bus QCA so as to operate under the control of the central buffer 106'. In the embodiment shown in FIG. 1b, the second level memory submodule 102b' is coupled to the central buffer 106' via a separate signal line CON to operate under the control of the central buffer 106'. In some other embodiments, the second level memory submodule 102b' may be coupled to the central buffer 106' via other signal lines, e.g. via the BCOM bus or the C/A bus QCA or a combination of these buses/signal lines. In other words, the memory submodules with different levels can be coupled to the central buffer via the same signal line(s)/bus(es) or different signal lines/buses.

Figure 1C:
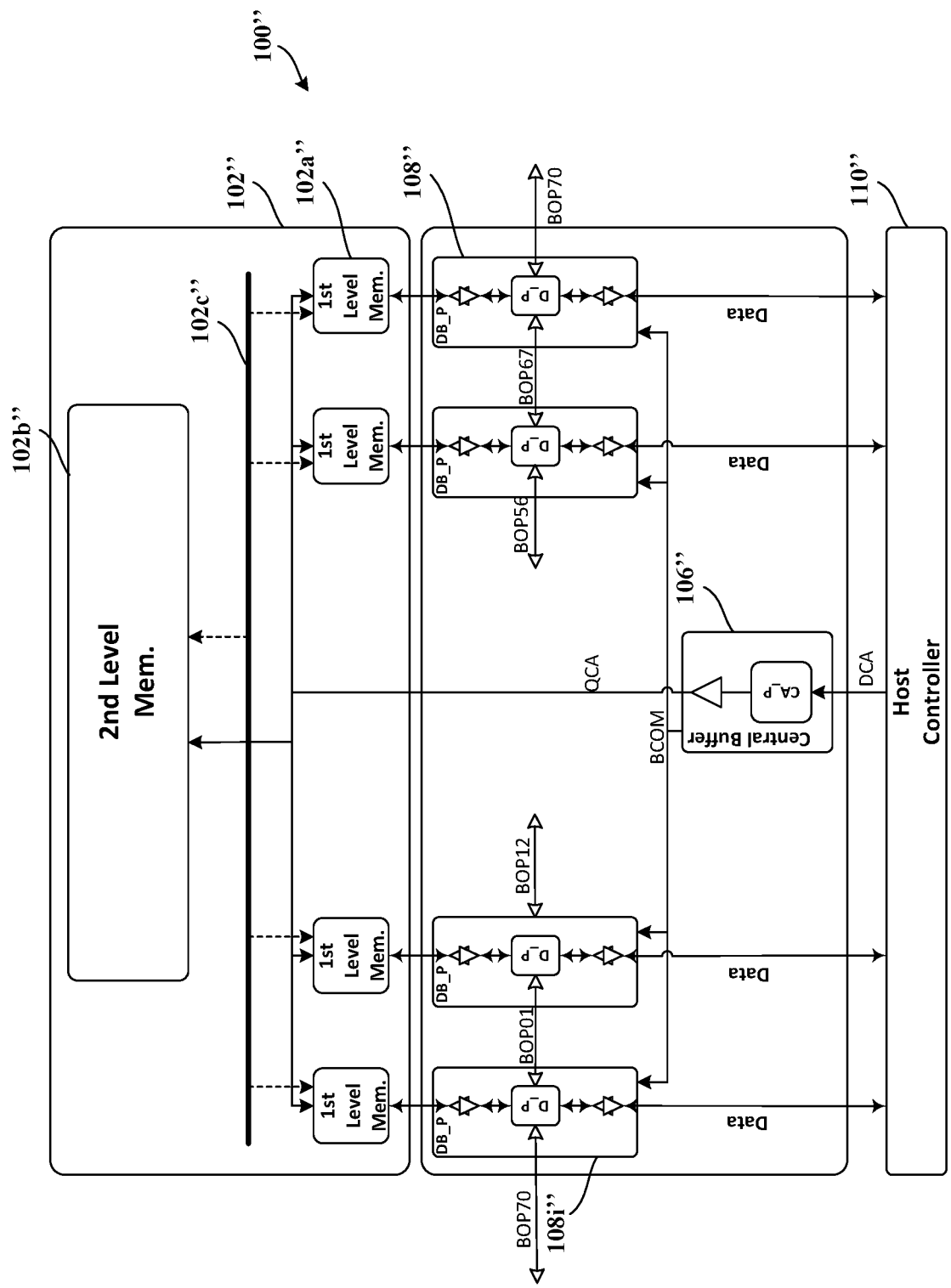
FIG. 1c shows a memory system 100" according to an embodiment of the application.

FIG. 1c shows a memory system 100" according to a further embodiment of the application. As shown in FIG. 1c, a first level memory submodule 102a" and a second level memory submodule 102b" of a memory module 102" of the memory system 100" are coupled to a central buffer 106" via a C/A bus QCA. The other parts of the memory system 100" shown in FIG. 1c are substantially the same as those of the memory system 100' shown in FIG. 1b, which will not be elaborated herein.

Still referring to FIG. 1b, the first level memory submodule 102a' and the second level memory submodule 102b' may have different memory types. For example, the first level memory submodule 102a' may be a volatile memory while the second level memory submodule 102b' may be a non-volatile memory (e.g. a solid state memory or a magnetic memory). It can be appreciated that the second level memory submodule 102b' shown in the embodiment of FIG. 1b may be a single memory die. In some other embodiments, the second level memory submodule 102b' may include multiple memory dies, and each first level memory submodule 102a' is coupled to one or more memory dies of the second level memory submodule 102b'.

In a write operation, the central buffer 106b' may send a command to indicate first writing data into the first level memory submodule 102a' and then transferring data from the first level memory submodule 102a' to the second level memory submodule 102b'. At this time data is secure. Alternatively, the central buffer 106b' may send a command to indicate first writing data into the first level memory submodule 102a' and then transferring data from the second level memory submodule 102b' to the first level memory submodule 102a' and indicating data storage addresses. At this time data at such storage addresses are secure.

The process for data read operation is similar to that for the write operation, which is not elaborated.

Figure 5:
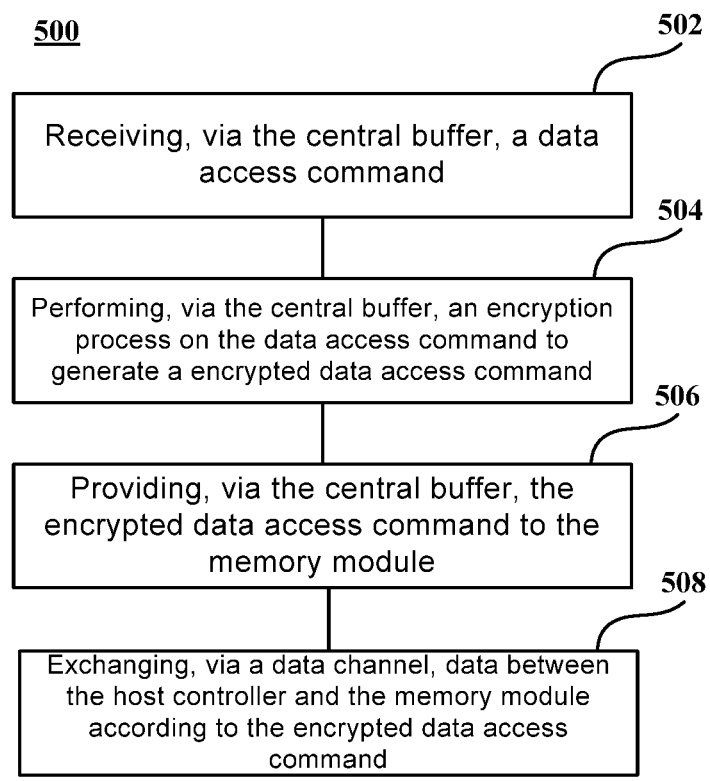
FIG. 5 illustrates a method 500 for performing access control to a memory module according to an embodiment of the application.

FIG. 5 shows a method 500 for performing access control to a memory module according to an embodiment of the application. The method 500 can be performed, for example, by the memory controller shown in FIG. 1a, 1b or 1c, or the memory controller shown in FIG. 4.

As shown in FIG. 5, the method 500 comprises:

Step 502, receiving a data access command via a central buffer;

Step 504, performing an encryption process on the data access command via the central buffer to generate an encrypted data access command;

Step 506, providing the encrypted data access command to a memory module via the central buffer; and Step 508, exchanging data between a host controller and the memory module via a data channel therebetween according to the encrypted data access command.

In some embodiments, the data channel may include a data buffer.

In some embodiments, the data access command and the encrypted data access command include respective access addresses, and the encryption process makes the access address contained in the encrypted data access command different from the access address contained in the data access command.

In some embodiments, the predefined command encryption algorithm in the access command processing module is configured when the memory controller is initiated.

In some embodiments, the access command processing module further contains a predefined command decryption algorithm, and the data access command received by the central buffer is a pre-encrypted data access command, the method further comprising:

before the step of performing encryption process to the data access command to generate the encrypted data access command, performing a decryption process on the pre-encrypted data access command via the central buffer with the predefined command decryption algorithm.

Figure 6:
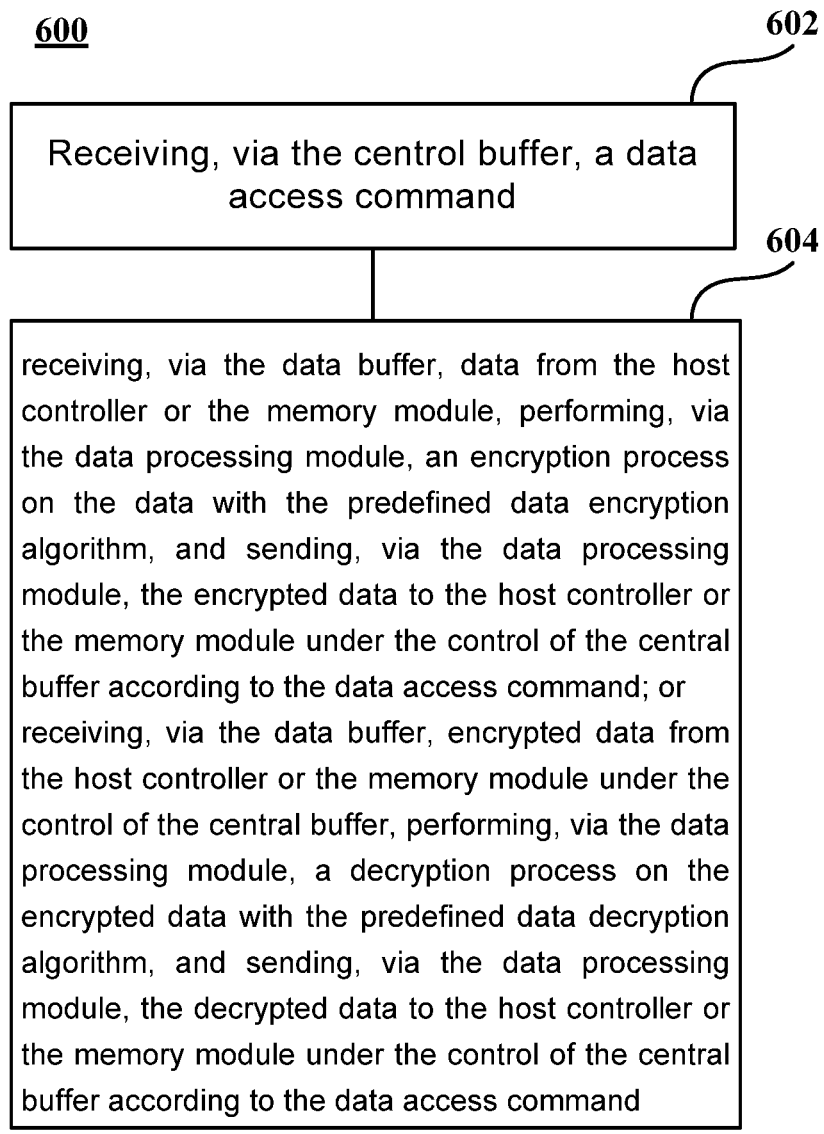
FIG. 6 illustrates a method 600 for performing access control to a memory module according to an embodiment of the application.

FIG. 6 shows a method 600 for performing access control to a memory module according to an embodiment of the application. The method 600 can be performed, for example, by the memory controller shown in FIG. 1a, 1b or 1c.

As shown in FIG. 6, in block 602, receiving a data access command via a central buffer.

In block 604, according to the data access command, receiving, via the data buffer, data from a host controller or a memory module, performing, via the data processing module, an encryption process on the data with a predefined data encryption algorithm, and sending, via the processing module, the encrypted data to the host controller or the memory module under the control of the central buffer; or According to the data access command, receiving, via the data buffer, encrypted data from the host controller or the memory module, performing, via the data processing module, a decryption process on the encrypted data with a predefined data decryption algorithm and sending, via the data processing module, the decrypted data to the host controller or the memory module under the control of the central buffer.

In some embodiments, before the step of sending the decrypted data to the host controller or the memory module, the method further comprises:

performing an encryption process on the decrypted data with the predefined data encryption algorithm, and then sending the encrypted data to the host controller or the memory module.

In some embodiments, the predefined data encryption algorithm and the predefined data decryption algorithm in the data processing module is configured when the memory controller is initiated.

For more details related to the method embodiments of the application, reference may be made to the related description about the device embodiments of the application.

It should be noted that, even though several steps of a method for performing access control to a memory module and various modules or sub-modules of a memory controller are mentioned in the forgoing detailed description, such division is merely exemplary but not mandatory. In fact, according to embodiments of the application, features and functions of two or more modules described above can be specified in one module. On the contrary, features and functions of one module described above can be further divided to multiple modules for specifying.

Those skilled in the art may understand and implement other variations to the disclosed embodiments from a study of the drawings, the disclosure, and the appended claims. In the claims, the words "comprise" or "comprising" do not exclude other elements or steps, and the indefinite article "a" or "an" does not exclude a plurality. In practical applications according to present application, one element may perform functions of several technical features recited in claims. Any reference symbols in the claims should not be construed as limiting the scope. The scope and spirit of the present application is defined by the appended claims.

What is claimed is:

1. A memory controller coupled between a memory module and a host controller to control access of the host controller to the memory module, the memory module comprising one or more of a volatile memory and a non-volatile memory, and the memory controller comprising:
   a central buffer having a receiving side coupled to a command/address bus to receive a data access command from the host controller, and an outputting side opposite to the receiving side and coupled to the memory module, the central buffer comprising:
   a buffer coupled between the receiving side and the outputting side to buffer the data access command;
   a access command processing module coupled between the receiving side and the outputting side and in parallel with the buffer, the access command processing module having a predefined command encryption algorithm and configured to receive the data access command transmitted through the command/address bus and to perform an encryption process on the data access command with the predefined command encryption algorithm to generate an encrypted data access command transmitted to the outputting side; wherein the data access command and the encrypted data access command comprise respective access addresses, and the encryption process makes the access address included in the encrypted data access command different from the access address included in the data access command; and
   a multiplexer coupled at the outputting side of the central buffer to switchably output the data access command buffered by the buffer or the encrypted data access command generated by the access command processing module to the memory module;
   wherein a data channel is coupled between the memory module and the host controller, and wherein under the control of the encrypted data access command, the memory module exchanges data with the host controller via the data channel.

2. The memory controller of claim 1, wherein the central buffer is configured to receive an algorithm configuration command to configure the predefined command encryption algorithm in the access command processing module, and wherein an interface via which the central buffer receives the algorithm configuration command is an interface for receiving the data access command or a system management bus interface.

3. The memory controller of claim 1, wherein the predefined command encryption algorithm in the access command processing module is configured when the memory controller is initiated.

4. The memory controller of claim 1, wherein the access command processing module further comprises a predefined command decryption algorithm, the data access command received by the memory controller is a pre-encrypted data access command, and the memory controller is further configured to perform a decryption process on the pre-encrypted data access command with the predefined command decryption algorithm, and further to perform an encryption process to the decrypted data access command with the predefined command encryption algorithm.

5. The memory controller of claim 1, wherein the memory controller further comprises:
   a data buffer coupled within the data channel, and coupled to the central buffer for receiving the encrypted data access command therefrom, such that under the control of the encrypted data access command, the memory module exchanges data with the central buffer via the data buffer within the data channel.

6. The memory controller of claim 5, wherein the data buffer comprises a data processing module, the data processing module comprises at least one of a predefined data encryption algorithm and a predefined data decryption algorithm; and the data processing module is configured for receiving data from the host controller and the memory module, performing an encryption process on the data with the predefined data encryption algorithm, and sending the encrypted data to the host controller or the memory module; or the data processing module is configured for receiving encrypted data from the host controller or the memory module, performing a decryption process on the encrypted data with the predefined data decryption algorithm, and sending the decrypted data to the host controller or the memory module.

7. The memory controller of claim 6, wherein the data processing module comprises a predefined data encryption algorithm and a predefined data decryption algorithm;

the data processing module is configured for receiving pre-encrypted data from the host controller, performing a decryption process on the pre-encrypted data with the predefined data decryption algorithm, then performing an encryption process on the decrypted data with the predefined data encryption algorithm, and sending the encrypted data to the memory module.

8. The memory controller of claim 6, wherein the central buffer and the data buffer are coupled to each other via a data buffer control bus, and the data processing module is configured to receive an algorithm configuration command via the data buffer control bus, and wherein the algorithm configuration command is used for configuring at least one of the predefined data encryption algorithm and the predefined data decryption algorithm.

9. The memory controller of claim 6, wherein the predefined data encryption algorithm and the predefined data decryption algorithm in the data processing module is configured when the memory controller is initialized.

10. The memory controller of claim 1, wherein the memory module and the memory controller are in accordance with the JEDEC DDR SDRAM standard, the central buffer is integrated in a register clock driver.

11. A method for performing access control to a memory module, the memory module being coupled to a host controller via a memory controller and via a data channel, the memory module comprising one or more of a volatile memory and a non-volatile memory, and the memory controller comprising a central buffer having a receiving side coupled to a command/address bus and an outputting side coupled to the memory module, and the central buffer comprising:

a buffer coupled between the receiving side and the outputting side to buffer the data access command;

an access command processing module coupled between the receiving side and the outputting side and in parallel with the buffer, wherein the access command processing module comprises a predefined command encryption algorithm for performing an encryption process on a data access command, and a multiplexer coupled at the outputting side of the central buffer;

the method comprising:

receiving, via the receiving side of the central buffer, a data access command;

receiving, via the access command processing module, the data access command transmitted through the command/address bus;

performing, via the central buffer, an encryption process on the data access command to generate an encrypted data access command, wherein the encryption process makes an access address included in the encrypted data access command different from another access address included in the data access command;

providing, via the outputting side of the central buffer, the encrypted data access command to the memory module;

switchably outputting, via the multiplexer, the data access command buffered by the buffer or the encrypted data access command generated by the access command processing module to the memory module; and exchanging, via the data channel, data between the host controller and the memory module according to the encrypted data access command.

12. The method of claim 11, wherein the data channel comprises a data buffer.

13. The method of claim 11, wherein the predefined command encryption algorithm in the access command processing module is configured when the memory controller is initialized.

14. The method of claim 11, wherein the access command processing module further comprises a predefined command decryption algorithm, and the data access command received by the central buffer is a pre-encrypted data access command, the method further comprising:

performing, via the central buffer, a decryption process on the pre-encrypted data access command with the predefined command decryption algorithm before the step of performing the encryption process on the data access command to generate the encrypted data access command.

15. The method of claim 11, wherein the memory module comprises one or more of the following: a flash memory, a magnetoresistive memory, a phase change memory, a resistive memory and a semi-floating gate memory.

16. The method of claim 11, wherein the memory module has a multi-level interconnected structure.

17. A method for performing access control to a memory module, the memory module being coupled to a host controller via a memory controller, the memory module comprising one or more of a volatile memory and a non-volatile memory, and the memory controller comprising a central buffer and a data buffer, the central buffer having a receiving side coupled to a command/address bus and an outputting side coupled to the memory module, the central buffer comprising:

a buffer coupled between the receiving side and the outputting side to buffer the data access command;

an access command processing module coupled between the receiving side and the outputting side and in parallel with the buffer, wherein the access command processing module having a predefined command encryption algorithm, and a multiplexer coupled at the outputting side of the central buffer;

the data buffer comprising a data processing module, wherein the data processing module comprises at least one of a predefined data encryption algorithm and a predefined data decryption algorithm, the method comprising:

receiving, via the receiving side of the central buffer, a data access command;

receiving, via the access command processing module, the data access command transmitted through the command/address bus;

performing, via the central buffer, an encryption process on the data access command with the predefined command encryption command to generate an encrypted data access command, wherein the encryption process via the central buffer makes an access address included in the encrypted data access command different from another access address included in the data access command; switchably outputting, via the multiplexer, the data access command buffered by the buffer or the encrypted data access command generated by the access command processing module to the memory module; and receiving, via the data buffer, data from the host controller or the memory module, performing, via the data processing module, an encryption process on the data with the predefined data encryption algorithm, and sending, via the data processing module, the encrypted data to the host controller or the memory module under the control of the central buffer according to the encrypted data access command; or receiving, via the data buffer, encrypted data from the host controller or the memory module under the control of the central buffer, performing, via the data processing module, a decryption process on the encrypted data with the predefined data decryption algorithm, and sending, via the data processing module, the decrypted data to the host controller or the memory module under the control of the central buffer according to the encrypted data access command.

18. The method of claim 17, before the step of sending the decrypted data to the host controller or the memory module, the method further comprising:

performing an encryption process on the decrypted data with the predefined data encryption algorithm, and then sending the encrypted data to the host controller or the memory module.

19. The method of claim 17, wherein the predefined data encryption algorithm and the predefined data decryption algorithm in the data processing module is configured when the memory controller is initiated.

20. The method of claim 17, wherein the memory module comprises one or more of the following: a flash memory, a magnetoresistive memory, a phase change memory, a resistive memory and a semi-floating gate memory.

21. The method of claim 17, wherein the memory module has a multi-level interconnected structure.

22. The method of claim 21, wherein the memory module has different levels of memory submodules which are coupled to the central buffer via respective signal lines.

23. A memory device, comprising a memory module and a memory controller coupled between the memory module and a host controller to control access of the host controller to the memory module, the memory module comprising one or more of a volatile memory and a non-volatile memory, and the memory controller comprising:

a central buffer having a receiving side coupled to a command/address bus to receive a data access command from the host controller, and an outputting side opposite to the receiving side and coupled to the memory module, the central buffer comprising:

a buffer coupled between the receiving side and the outputting side to buffer the data access command;

a access command processing module coupled between the receiving side and the outputting side and in parallel with the buffer, the access command processing module having a predefined command encryption algorithm and configured to receive the data access command transmitted through the command/address bus and to perform an encryption process on the data access command with the predefined command encryption algorithm to generate an encrypted data access command transmitted to the outputting side; wherein the data access command and the encrypted data access command comprise respective access addresses, and the encryption process makes the access address included in the encrypted data access command different from the access address included in the data access command; and a multiplexer coupled at the outputting side of the central buffer to switchably output the data access command buffered by the buffer or the encrypted data access command generated by the access command processing module to the memory module;

wherein a data channel is coupled between the memory module and the host controller, and wherein under the control of the encrypted data access command, the memory module exchanges data with the host controller via the data channel.

24. The memory device of claim 23, wherein the memory module comprises one or more of the following: a flash memory, a magnetoresistive memory, a phase change memory, a resistive memory and a semi-floating gate memory.

25. The memory device of claim 23, wherein the memory module has a multi-level interconnected structure.

26. The memory device of claim 25, wherein the memory module has different levels of memory submodules which are coupled to the central buffer via respective signal lines.

27. A memory device, comprising a memory module and a memory controller coupled between the memory module and a host controller to control access of the host controller to the memory module, the memory module comprising one or more of a volatile memory and a non-volatile memory, and the memory controller comprising:

a data buffer coupled to the central buffer for receiving the data access command from the central buffer, and coupled between the host controller and the memory module for exchanging data between the host controller and the memory module under the control of the data access command;

a central buffer having a receiving side coupled to a command/address bus to receive a data access command from the host controller, and an outputting side opposite to the receiving side and coupled to the memory module, the central buffer comprising:

a buffer coupled between the receiving side and the outputting side to buffer the data access command; and an access command processing module coupled between the receiving side and the outputting side and in parallel with the buffer, the access command processing module having a predefined command encryption algorithm and configured to receive the data access command transmitted through the command/address bus and to perform an encryption process on the data access command with the predefined command encryption algorithm to generate an encrypted data access command transmitted to the outputting side; wherein the data access command and the encrypted data access command comprise respective access addresses, and the encryption process makes the access address included in the encrypted data access command different from the access address included in the data access command; and a multiplexer coupled at the outputting side of the central buffer to switchably output the data access command buffered by the buffer or the encrypted data access command generated by the access command processing module to the memory module:

wherein the data buffer comprises a data processing module, and the data processing module comprises at least one of a predefined data encryption algorithm and a predefined data decryption algorithm;

the data processing module is configured for receiving data from the host controller or the memory module, performing an encryption process on the data with the predefined data encryption algorithm, and sending the encrypted data to the host controller or the memory module according to the encrypted data access command; or the data processing module is configured for receiving encrypted data from the host controller or the memory module, performing a decryption process on the encrypted data with the predefined data decryption algorithm, and sending the decrypted data to the host controller or the memory module according to the encrypted data access command.

28. The memory device of claim 27, wherein the memory module comprises one or more of the following: a flash memory, a magnetoresistive memory, a phase change memory, a resistive memory and a semi-floating gate memory.

29. The memory device of claim 27, wherein the memory module has a multi-level interconnected structure.

30. The memory device of claim 29, wherein the memory module has different levels of memory submodules which are coupled to the central buffer via respective signal lines.

* * * * *